US008656269B1

(12) United States Patent
Yuasa et al.

(10) Patent No.: US 8,656,269 B1
(45) Date of Patent: Feb. 18, 2014

(54) PROVIDING A FUNCTIONALITY BY LOADING LOGIC INTO A DOCUMENT

(75) Inventors: Kei Yuasa, Sunnyvale, CA (US); Kannan Govindarajan, Sunnyvale, CA (US); Harumi A. Kuno, Cupertino, CA (US); Kevin L. Smathers, Hayward, CA (US); W. Kevin Wilkinson, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2627 days.

(21) Appl. No.: 11/389,747

(22) Filed: Mar. 27, 2006

(51) Int. Cl.
*G06F 17/00* (2006.01)

(52) U.S. Cl.
USPC ......................................................... 715/212

(58) Field of Classification Search
USPC ................................................. 715/212, 226
See application file for complete search history.

(56) References Cited

U.S. PATENT DOCUMENTS

| | | | | |
|---|---|---|---|---|
| 5,987,443 | A * | 11/1999 | Nichols et al. | 706/11 |
| 2004/0104931 | A1 * | 6/2004 | Schmitt | 345/744 |
| 2005/0097450 | A1 * | 5/2005 | Lumera et al. | 715/511 |

OTHER PUBLICATIONS

K. Wilkinson et al., Enabling Outsourced Service Providers to Think Globally While Acting Locally, EDBT 2006:1106-1109.
G. Reif et al., "WEESA—Web Engineering for Semantic Web Applications," WWW Conference, May 2005, Chiba, Japan, pp. 722-729.
L.B. Huston et al., "Disconnected Operation for AFS," Technical Report citi-tr-93-3, University of Michigan, CITI (1993), pp. 1-9.
J. Maniscalco, "Empowering the User—Personal Process Atuomation," eAI Journal (Dec. 2002), pp. 43-46.
JJ. Kistler et al., "Disconnected Operation in the Coda File System," ACM Transaction on Computer Systems, vol. 10, No. 1 (Feb. 1992), pp. 3-25.
H. Kuno et al., "Governing the Contract Lifecycle: A Framework for Sequential Configuration of Loosely-Coupled Systems," 4th Int'l Workshop on Databases in Networked Information Systems (DNIS 2005)Mar. 28-30, 2005, University of Aizu, Aizu-Wakamatsu, Japan, pp. 1-16.
Microsoft Corporation, "Smart Client Offline Application Block," http://msdn.microsoft.com/smartclient/understanding/default.aspx?pull= /library/en-us/dnp . . . , pp. 1-10 (at least as early as Nov. 4, 2005).
Microsoft Corporation, "Smart Client Application Model and the .NET Framework 1.1," http://msdn.microsoft.com/netframework/programming/winforms/smartclient.aspx, pp. 1-9 (at least as early as Nov. 4, 2005).

* cited by examiner

*Primary Examiner* — Laurie Ries

(57) ABSTRACT

To implement at least one functionality, a template having one or more logic components corresponding to the at least one functionality is provided. The template and a data collection are accessed to load the one or more logic components and data into a closure document. The closure document is provided to enable updating of data in the closure document using the one or more logic components.

20 Claims, 5 Drawing Sheets

PROVIDING A FUNCTIONALITY BY LOADING LOGIC INTO A DOCUMENT

BACKGROUND

Network connectivity of nodes has enhanced user convenience. For example, a user at a client computer that is coupled to a data network can access a server over the data network to access various features on the server, such as information or services on the server. Examples of servers include web servers that provide web-based applications that are accessible by users. Web-based applications provide for e-commerce services, online research services, and other services.

Implementing web-based applications is usually relatively complicated. Specialized software and skilled programmers are normally involved in developing web-based applications, which leads to increased costs and implementation time.

Also, when accessing a web-based application, a client computer typically remains connected to the server over the data network (online mode of operation) to enable a user to continue to access the features of the web-based application. However, a user may not always have access to a network connection (such as when the user is at a remote location), in which case the user may lose access of the server and thus the web-based application provided by the server.

BRIEF DESCRIPTION OF THE DRAWINGS

Some embodiments of the invention are described with respect to the following figures.

DETAILED DESCRIPTION

Figure 1:
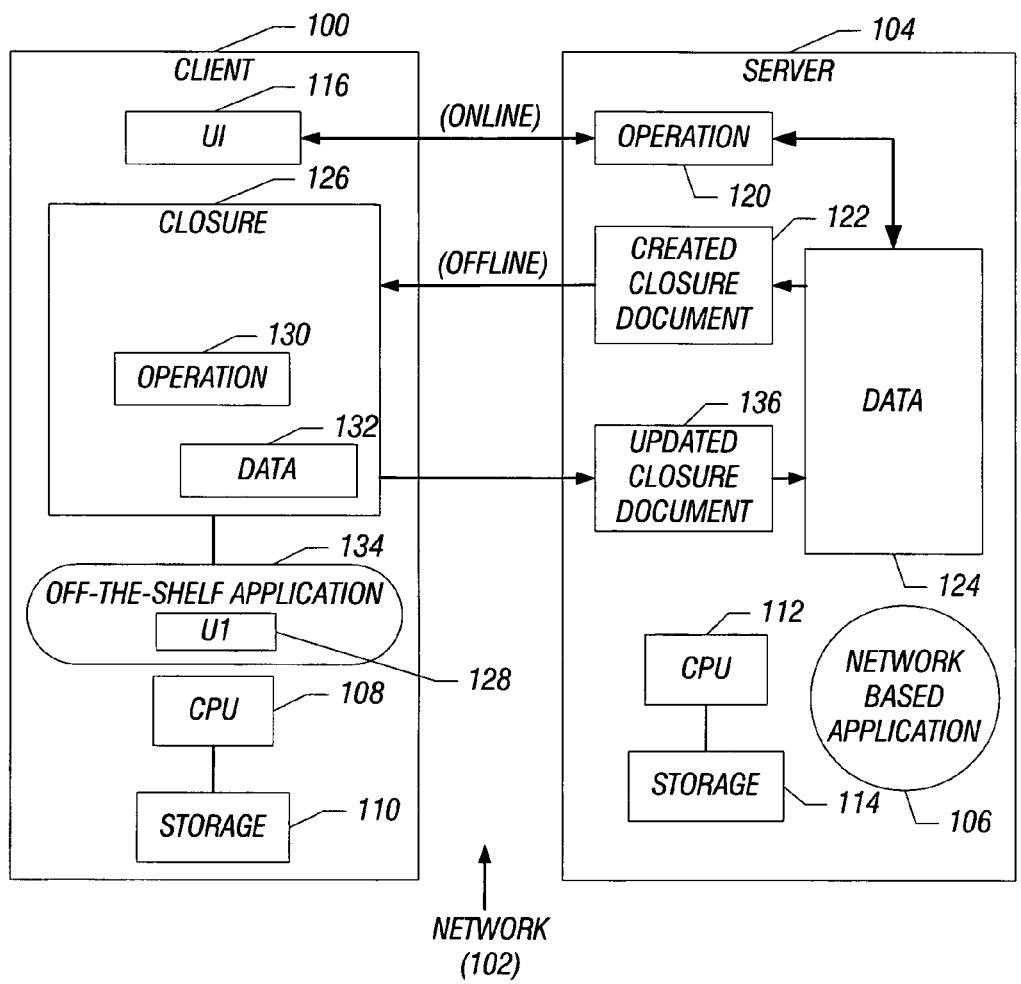
FIG. 1 is a block diagram of an arrangement that includes a client and a server, in which a closure document according to an embodiment can be provided.

In accordance with some embodiments, to simplify implementation of functionalities associated with network-based applications or other types of applications, "off-the-shelf" applications are used to implement the functionalities. A "functionality" refers to any service, such as web services, business services, and other services that can be provided in a system. A "network-based application" refers to software, hardware, or a combination of hardware and software that provides various services and/or data at a network node. An example network-based application is a web-based application that provides web-based services, such as online shopping services or other e-commerce (electronic commerce) services, customer support services, financial services, online research services, and so forth.

The term "off-the-shelf application" refers to a software application that is generally available and that can be purchased and loaded on a computer. Examples of off-the-shelf applications include spreadsheet applications such as the Microsoft EXCEL® application. Another example of an off-the-shelf application is a word processing application, such as the Microsoft WORD® application. Other off-the-shelf applications can be used in other embodiments.

In the ensuing discussion, reference is made to implementing functionalities of network-based applications. However it is noted that the same techniques can be applied to functionalities of other types of applications.

The functionalities of the network-based application that are to be implemented are abstracted into logic components that are implemented in a template. The network-based application in cooperation with the off-the-shelf application are able to access the template, along with data from a data collection associated with the network-based application, to create a closure document containing the data and embedded logic components corresponding to the functionalities of the network-based application. A "closure document" refers to a document, file, or any other object that contains data and embedded logic to operate on the data. Although referred to in the singular, a "closure document" can also refer to multiple documents, files, or other objects.

A closure document functions as a data structure that holds at least one expression and an environment of variable bindings in which that expression is to be evaluated. The closure document is derived from a document template, which has placeholders (e.g., in the form of a cell format that has an arrangement of cells) as data, and macros or expressions as logic. When values of data are provided to the closure document, the document logic works as a closure expression, and the document functions as a closure. A "closure" is a self-contained unit of computation that includes data and logic components to perform operations on the data.

A "template" (or "document template") refers to a data structure that contains logic components corresponding to functionalities of the network-based application, and that contains data closure information (e.g., placeholders such as an arrangement of cells) that identifies a format or layout of the closure document and identifies variables to be used by the logic components. The data closure information is used to populate a closure document with appropriate data values from a data collection.

The closure document can then be used at a server where the network-based application is loaded. Alternatively, the closure document can be downloaded by a server (that provides the network-based application) to a client. Using the closure document that is created according to a template enables effecting of the functionalities, such as functionalities of a web-based application or business services provided by the functionalities.

A "server" refers to a network node (e.g., a computer) that manages network resources such as the software, hardware, or combination of hardware and software mentioned above. A "client" refers to a network node (e.g., a computer) that is able to submit requests to a server to access resources managed by the server. In many cases, a network node can be both a client and a server.

A user or software application (at the server or client) can modify (add, delete or update) data contained in the closure document, either manually or by invoking the embedded logic in the closure document. Manual modification of the data contained in the closure document by the user refers to the user directly updating the data in the document.

In some scenarios, the modification of data in the closure document and the performance of operations by logic embedded in the closure document can be performed offline at the client. The modified and processed data (resulting from offline operation) in the closure document can subsequently be loaded back to the server to update the database (or other data collection) associated with the server.

An offline mode of operation refers to an operation in which an active connection is not maintained between the client and the server to perform operations with respect to a network-based application. In other words, the client does not have to remain online with the server to perform operations with respect to the network-based application, so that network traffic due to operation of the network-based application does not occur during the time that the client is offline. In accordance with some embodiments, a network-based application provided by a server can be operated in offline mode by a client by providing the closure document from the server to the client.

The closure document can be accessed, either at the server or at the client, by an off-the-shelf software application that is readily available to a wide range of users (so that specialized or custom software does not have to be generated to access the closure document). The ability to access the closure document using an off-the-shelf application enhances convenience and reduces costs associated with operation of the network-based application. For example, dedicated and specialized software do not have to be provided at the client to enable offline access of the content of the closure document. Dedicated software tends to be costly to implement, and usually involves the added expense of having to train users regarding use of the dedicated software. On the other hand, users are generally familiar with off-the-shelf applications, which tend to be widely available. Also, all other applications compatible with the format of the off-the-shelf application can also be used to access or otherwise manipulate the closure document, which enhances further convenience and flexibility.

FIG. 1 illustrates an example arrangement in which a client 100 is coupled to a server 104 by a network 102. The network 102 can be any type of network, such as a local area network (LAN), wide area network (WAN), the Internet, and so forth. The client 100 includes one or plural central processing units (CPUs) 108 that is (are) coupled to a storage 110. Similarly, the server 104 includes one or plural CPUs 112 that is (are) coupled to a storage 114. A network-based application 106 is executable on the CPU(s) 112 of the server 104.

FIG. 1 depicts two types of techniques of accessing functionalities of the network-based application 106: an online technique and an offline technique. With the online technique, the client 100 establishes a session with the server 104 over the network 102, and remains connected during the session. Through a user interface 116 (e.g., a web browser) in the client 100, a user at the client 100 is able to access a data collection 124 (e.g., a database) stored in the storage 114 of the server 104. Also, during the session, the user interface 116 is able to specify one or more operations 120 to be performed on the data collection 124. The specification of operations to be performed on the data collection 124 is performed by sending requests over the network 102 from the user interface 116 in the client 100 to the network-based application 106 in the server 104. Thus, during the course of the online session, requests and data are continually communicated between the client 100 and server 104 over the network 102.

With the offline technique, the client 100 does not have to remain connected to the server 104 over the network 102 for the duration of a session in which data of the server 104 is being modified and processed according to functionalities provided by the network-based application 106. To enable offline mode, the server 104 creates a closure document 122 that contains data from the data collection 124 stored in the storage 114 of the server 104.

The closure document 122 that is created also contains embedded logic components that correspond to functionalities of the network-based application 106 that the user desires to access. The process of creating a closure document is described in greater detail further below in connection with FIGS. 2, 4, and 5. Once created, the closure document can be communicated over the network 102 to the client 100.

As depicted in FIG. 1, the closure or closure document 122 is communicated by the server 104 to the client 100, which processes and stores the closure or closure document 122 from the server 104 as closure or closure document 126 in the server 104.

The closure document 126 includes an operation block 130 (made up of embedded logic components relating to the functionalities of the network-based application 106 in the server 104), and a data block 132 (which contains the data 124 of the server 104).

The client 100 also includes an off-the-shelf application 134 (e.g., a spreadsheet application) executable on the CPU 108 of the client 100. The off-the-shelf application 134 allows the user at the client 100 to access the closure document 126 for the purpose of modifying the data 132 and for performing operations on the data 132 using the embedded logic components (in the operation block 130) in the closure document 126. The off-the-shelf application 134 has a user interface component 128 (e.g., a user interface of a spreadsheet if the off-the-shelf application is a spreadsheet application), In an alternative arrangement, the user interface 116 of the client 100 (rather than the user interface component 128 of the off-the-shelf application 134) can be selected for the purpose of enabling user access of the closure document 126.

Once the data 132 in the closure document 126 has been modified, and operations have been performed on the data using the embedded logic components in the operation block 130, the modified closure document can be sent back to the server 104 as an updated closure document 136. The modified data in the updated closure document 136 is loaded back into the data collection 124 stored in the server storage 114.

In the discussion above, updating data in a closure document has been discussed in the context of offline mode. However, note that the closure document 126 can also be used during online mode (in which an active connection is maintained between the client 100 and the server 104) to enable modification of data 132 contained in the closure document 126 at the client 100. Alternatively, instead of processing the closure document 126 at the client 100, the closure document 122 can instead be used at the server 104 to update data contained in the closure document 122 to form the updated closure document 136.

Figure 2:
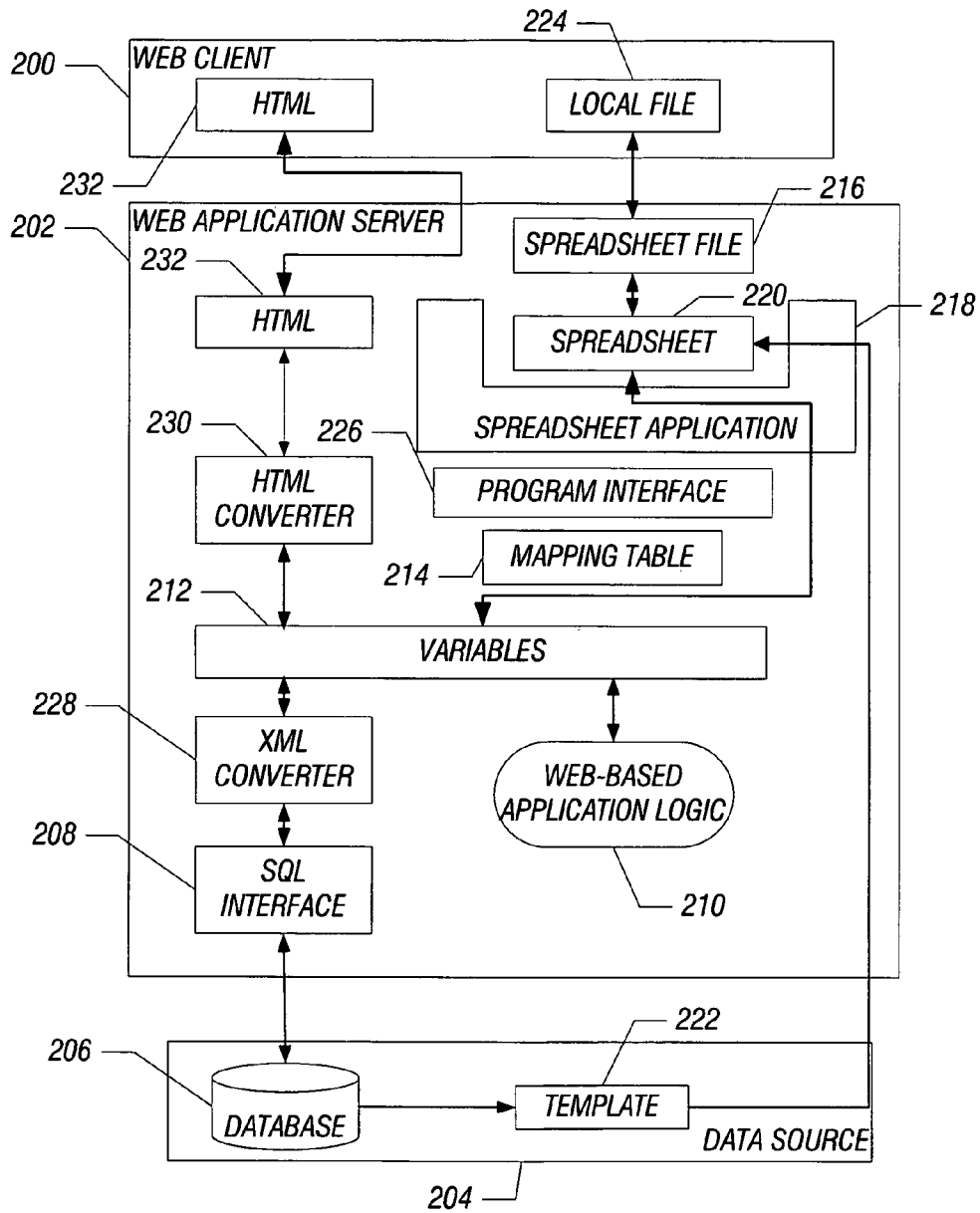
FIG. 2 is a block diagram of an arrangement of a web client, a web application server, and a data source, in which a closure document according to an embodiment can be provided.

FIG. 2 shows another arrangement according to an example embodiment. A web client 200 is coupled to a web application server 202 over a network (corresponding to the client 100 and server 104, respectively, in the more general arrangement of FIG. 1). The web application server 202 is in turn coupled to a data source 204 that includes a database 206 (corresponding to the data collection 124 of FIG. 1). Data in the database 206 is accessible by the web application server 202 through a database query language interface (such as SQL or Structured Query Language interface 208).

The SQL interface 208 enables the submission of SQL queries (which are database queries) to the database 206 for the purpose of accessing data contained in the database 206. The web application server 202 includes web-based application logic 210 (corresponding to logic of the network-based application 106 of FIG. 1) that provides various functionalities accessible by the web client 200. The web-based application that includes the web-based application logic 210 also includes other components, such as components 230, 212, 218, 214, and 226.

The web-based application logic 210 accesses various variables 212, which correspond to columns of a table maintained by the database 206. The columns of the table contain data can be accessed (retrieved or modified) by the web-based application logic 210.

A mapping table 214 is maintained by the web application server 202 to map between the variables 212 and content of a closure document that can be created by the web application server 202. In the FIG. 2 embodiment, the closure document is in the form of a spreadsheet file 216 accessible by a spreadsheet application 218. The spreadsheet file 216 contains various cells arranged in rows and columns that are able to store data. The mapping table 214 maps the variables 212 that are worked upon by the web-based application logic 210 to respective cells of the spreadsheet file 216. Thus, for example, a column of cells in the spreadsheet file 216 can be used to store information for a first variable, another column of cells can be used to store information for a second variable, and so forth.

The spreadsheet application 218 creates an initial document (in the form of an initial spreadsheet 220) that contains locations (in the form of cells) designated for storing values of corresponding variables 212. Note that the initial spreadsheet 220 does not actually contain the data from the database 206. The initial spreadsheet 220 also contains embedded logic (corresponding to the functionalities of the web-based application logic 210) to be applied on specific locations (cells) of the initial spreadsheet 220.

The logic components to be embedded into the initial spreadsheet 220 are stored in a template 222 (in the data source 204). The template 222 is accessed by the web application server 202 to load the logic components into the initial spreadsheet 220. Data values are then retrieved from the database 206 to populate the cells of the initial spreadsheet 220 (according to data closure information in the template 222) to create the spreadsheet file 216 (which contains both data and embedded logic components).

The spreadsheet file 216 is the closure document that is communicated from the web application server 202 to the web client 200, which is stored as a local spreadsheet file 224 in the web client 200. The local spreadsheet file 224 can be used at the web client 200, possibly offline, for modifying data in the local file 224 as well as to perform various operations provided by the embedded logic components in the local file 224.

FIG. 2 further depicts a programming interface 226 between the spreadsheet application 218 and the mapping table 214 to enable access (by the spreadsheet application 218) of the mapping table 214 for the purpose of mapping data values corresponding to the variables 212 to specific cells of the initial spreadsheet 220.

In one example implementation, the spreadsheet application 218 is a Microsoft EXCEL® application, the web application server 202 includes an HS (Internet Information Services)/ASP.NET component, and the program interface 226 is Microsoft's DCOM (Distributed Common Object Model) application. In other implementations, other components can be used.

Also depicted as being part of the web application server 202 of the FIG. 2 arrangement is an XML (Extensible Markup Language) converter 228 to convert data values retrieved using SQL queries into XML format for further processing by the web application server 202. In an alternative embodiment, the XML converter 228 can be omitted or replaced with another type of interface or converter.

The web application server also includes an HTML (Hypertext Markup Language) converter 230 to convert data values retrieved from the database 206 into an HTML format (the data values are stored in an HTML document 232). The HTML document 232 can be communicated from the web application server 202 to the web client 200. The ability to exchange HTML documents between the web client 200 and web application server 202 allows for typical online access of data values stored in the database 206. In an alternative embodiment, instead of using HTML, a different format can be defined for documents exchanged between the web client 200 and the web application server 202.

As depicted in FIG. 2, to allow for future processing in the database 206 of data updated by the web client 200, the closure document (in the form of spreadsheet file 216) is provided to the web client 200, rather than providing the HTML document 232.

Figure 3:
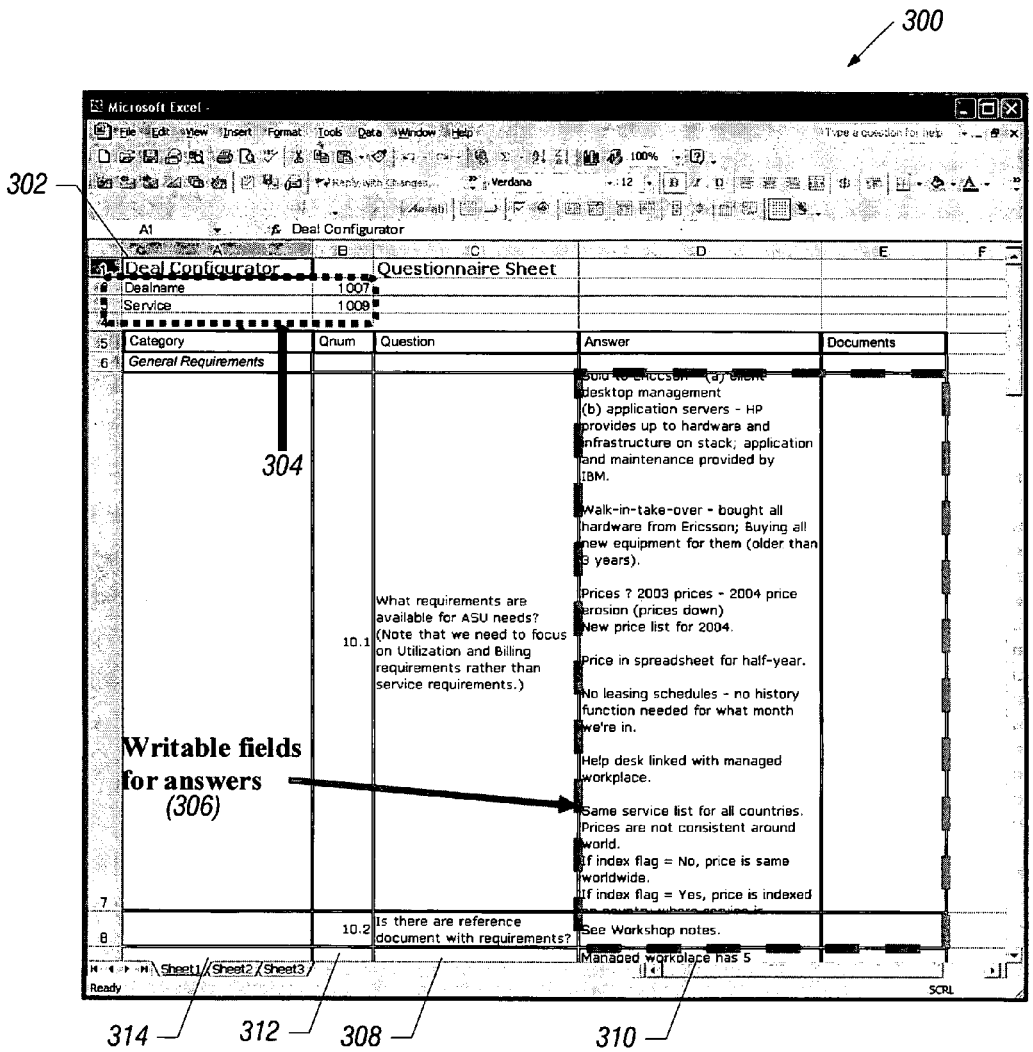
FIG. 3 illustrates a graphical user interface (GUI) screen generated by an application based on a closure document, according to an embodiment.

FIG. 3 depicts an example graphical user interface (GUI) screen 300 (as depicted in the user interface of the client or server) that contains cells of an example closure document (which is in the form of an EXCEL® spreadsheet file in the example of FIG. 3). The displayed screen 300 of the closure document is provided by the Microsoft EXCEL® application, in one example embodiment. In the example of FIG. 3, the network-based application that runs in the server (such as server 104 in FIG. 1 or server 202 in FIG. 2) is named "Deal Configurator," as indicated in cell 302 in FIG. 3. The Deal Configurator application provides a questionnaire sheet that includes various questions (in a "Question" column 308 of the spreadsheet file). The spreadsheet file also includes identifiers 304 for the questionnaire.

Other columns in the spreadsheet file include a Qnum column 312 (to identify the question number) and a Category column 314 (to identify the category that the questions pertain to). The "Qnum" column indicates the question number, and the "Question" column 308 contains the questions to ask a user. The closure document 300 is usable by a user (such as at the client or server), with the user being able to enter answers into an Answer column 310. Although not depicted in FIG. 3, note that logic components embedded in the closure document can be used to process the answers provided in the "Answer" and "Documents" columns 310 for generating further data values that can be provided in other cells of the closure document.

The screen 300 is provided for purposes of example, as other closure documents can have other formats.

Figure 4:
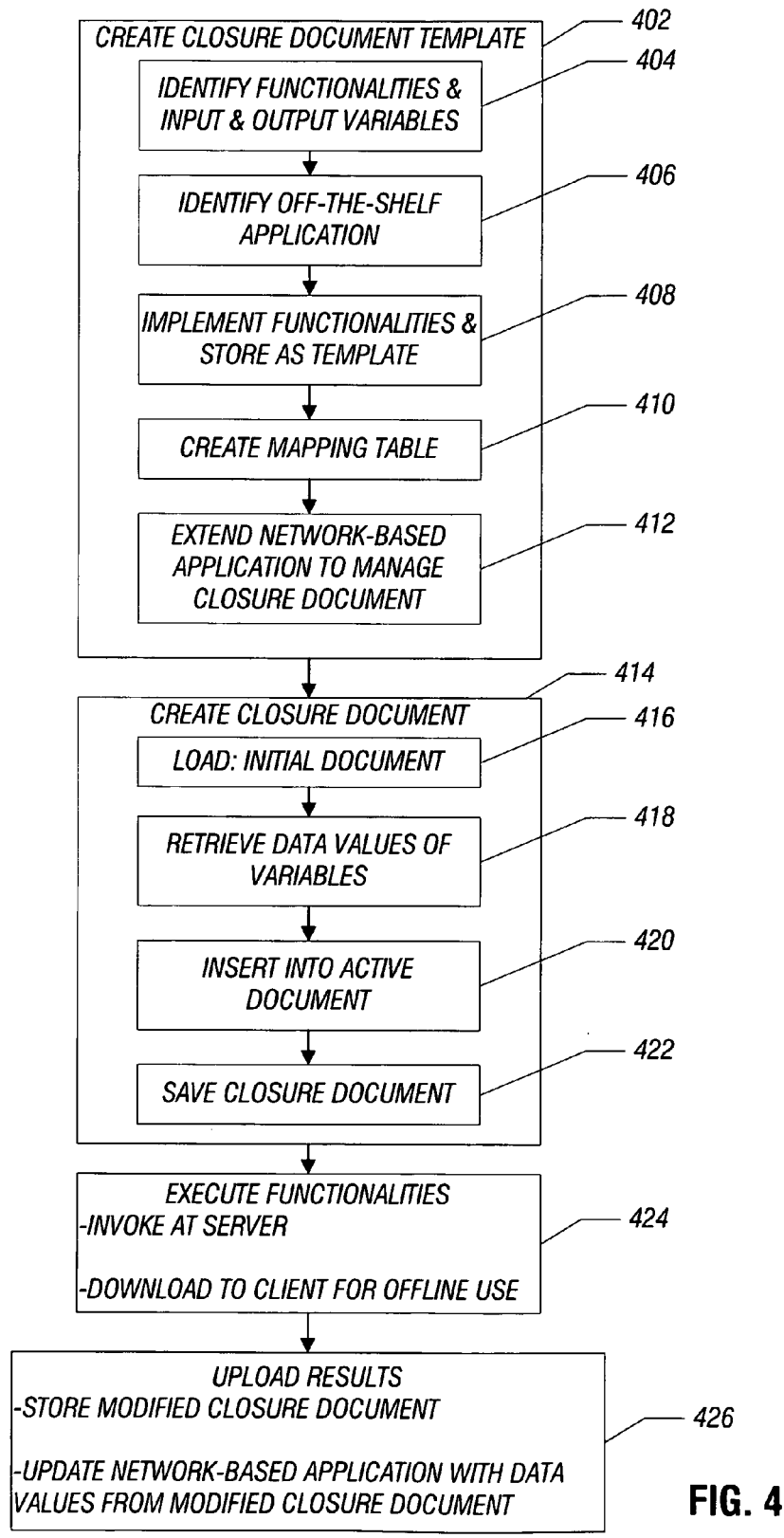
FIG. 4 is a flow diagram of a process according to an embodiment for generating and using a closure document.

FIG. 4 is a flow diagram of a process performed in accordance with an embodiment. Initially, a closure document template (such as template 222 in FIG. 2) is created (at 402). Creating the closure document template can be managed by an entity other than the developer of the network-based application (such as network-based application 106 in FIG. 1 or the web-based application logic 210 in FIG. 2). In this manner, the closure document template can be modified without modifying the underlying network-based application for enhanced flexibility. The process of creating a template at 402 includes tasks 404, 406, 408, 410, and 412, explained below.

One or more functionalities of the network-based application, and associated input and output parameters of the one or more functionalities, are identified (at 404). The identified one or more functionalities are the functionalities that are to be implemented for the network-based application. The identified one or more functionalities can be new functionalities or modifications of existing functionalities.

Next, an off-the-shelf application (e.g., EXCEL®) that is capable of supporting the operations to implement the one or more identified functionalities is then identified (at 406). Next, the one or more functionalities are implemented (at 408) using the off-the-shelf application, and the implementation is saved as a template (such as template 222 in FIG. 2). In one example, formulas provided by EXCEL® or capabilities provided by VISUAL BASIC® (a programming language from Microsoft for developing applications) that correspond to the one or more functionalities can be incorporated into an EXCEL® workbook (a template with named cells that correspond to the input and output variables). The template includes logic components (such as the EXCEL® formulas, and data closure information, such as in the form of placeholders (e.g., cells of an EXCEL® spreadsheet).

Also, a mapping table (e.g., 214 in FIG. 2) is created (at 410) to map the input and output variables to locations within the closure document (such as cells of a spreadsheet file). In addition to mapping locations of the closure document with the variables, the mapping table 214 can also provide additional information regarding each variable, such as whether the variable is an input variable or output variable. In one example, a mapping table is created to map variables implemented by the network-based application and cell names in an EXCEL® template workbook. In a different embodiment, tags from a schema are used to identify places within a closure document and to express the relationship to other pieces of information associated with the network-based application, using a language to describe the relationship.

In addition, the network-based application is extended (at 412) with the ability to manage a closure document. Managing a closure document refers to either receiving and processing a closure document, or creating a closure document. As an example, the network-based application may be implemented using Microsoft.NET, with .NET closure document capabilities to create a document manager (e.g., an EXCEL® document manager) capable of creating the closure document (e.g., an EXCEL® active spreadsheet file).

Once the tasks associated with creating the closure document template (402) have been performed, a closure document can be created (at 414) in response to a user request to access the network-based application and its associated data. Tasks 416, 418, 420, and 422 are part of the create closure document task (414).

The network-based application is able to load an initial document (at 416) based on the template created at 402. For example, in FIG. 2, the initial document is the initial spreadsheet 220 that has a format supported by the off-the-shelf application identified at 406. The initial document is loaded by opening the template (created at 402). The initial document includes locations for storing variable values as well as embedded logic components to perform the one or more identified functionalities. For example, in an active spreadsheet file, certain cells in the active spreadsheet file can be associated with logic for performing various computations, such as mathematical computations.

Data values of the variables are retrieved (at 418) from a database (e.g., database 206 in FIG. 2) to be inserted (at 420) into the initial document. The data values are retrieved and inserted into the initial document (such as by the spreadsheet application 218 of FIG. 2). For example, cell names of an active spreadsheet file can be used to identify locations within the active spreadsheet file in which data values are to be inserted. Alternatively, places in the closure document can be annotated with tags from a schema and values of those tags are filled in at the annotated places. The cell names or tags are examples of data closure information derived from the template to enable appropriate population of the closure document with data values.

Once data values have been filled into the closure document for the corresponding variables, the closure document can be saved (at 422) for subsequent use. Note that the saved closure document is in a file separate and different from the template. Certain fields of the closure document can be locked to protect such fields from modification. Thus, proprietary data or functions can be hidden from view of the user.

Next, in response to commands (such as requests from a user or a software application), the one or more functionalities provided in the closure document are executed (at 424). The one or more functionalities embedded in the closure document can be invoked at the server (such as by the spreadsheet application 218 of FIG. 2). Alternatively, the one or more functionalities embedded in the closure document can be invoked at the client (such as by the off-the-shelf application 134 in FIG. 1). To enable invocation of the one or more functionalities at the client, the closure document is downloaded to the client for offline use. At the client, a user can select a desired user interface to access the closure document. One user interface that can be selected is the spreadsheet interface (e.g., the interface of an EXCEL® application). Another possible user interface is a web browser interface that can be used to access the closure document.

Invocation of the functionalities at 424 (either at the server side or the client side) may cause the data in the closure document to be modified. The results corresponding to the modified closure document are uploaded (at 426) to the original database (such as database 206 in FIG. 2). To upload the results in the case where the closure document was modified at the client, the modified closure document is first communicated from the client to the server. The modified closure document is stored, and the network-based application at the server is updated with the data values from the modified closure document. This involves communicating the data values from the modified closure document to the network-based application, which re-integrates the results into the database (e.g., database 206 in FIG. 2). Optionally, the network-based application may invoke specialized update logic at this point for updating the database with the data values from the modified closure document.

A benefit of being able to update the closure document at the client is that offline access and processing of data of a remote server can be performed at the client. Offline access is useful when a user does not have the ability to connect to the server (such as when the user is at a remote location). The modified closure document can later be re-integrated back to the server once the user has moved to a location where network connection is available.

An example technique of invoking the one or more functionalities involves specifying the invocation of logic associated with a particular cell within an active spreadsheet file. The logic associated with a specific cell may be invoked by the off-the-shelf application, or alternatively, may be invoked manually by a user who also is able to modify the data values within the active spreadsheet file. Any data values created or modified by the invoked one or more functionalities is stored back into the closure document itself, either at the original location of a data value that has been modified or at a new location, such as for a newly-created data value.

Figure 5:
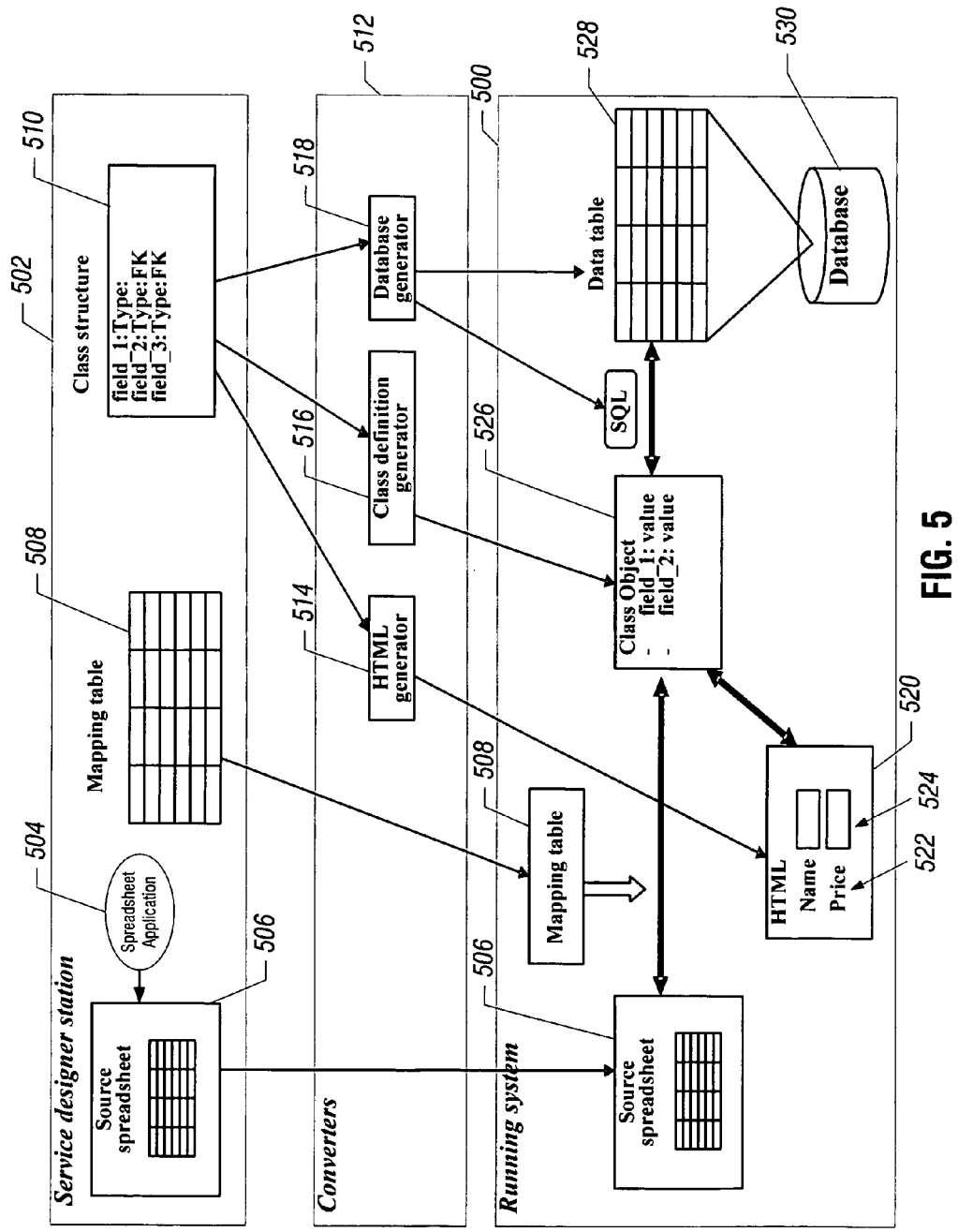
FIG. 5 illustrates how a new service can be added to a system, in accordance with an embodiment.

FIG. 5 illustrates how a service designer (e.g., a programmer, database administrator, a business manager, etc.) can provide the ability to enable a running system 500 to create closure documents containing one or more embedded functionalities. The running system 500 corresponds to server 104

(FIG. 1) or server 202 (FIG. 2). The ability to add a service in the form of one or more functionalities embedded in a closure document is referred to as "adaptive calculation." Adaptive calculation allows for the service designer to provide any arbitrary functionality that the service designer wishes to make available as a network-based application at a server. New services can be added, or existing services can be modified without having to modify or re-load a network-based application at the running system 500 (server 104 or 202).

A service designer at a service designer station 502 (which can be a local computer of the service designer) can identify that a new functionality (or functionalities) to be added can be implemented using a spreadsheet application 504. The new functionality (or functionalities) is (are) implemented with logic components that are supported by the spreadsheet application. For example, the service designer at the service designer station can generate a source spreadsheet 506 (which is a template, such as the template discussed in connection with FIGS. 2 and 4), in which logic components (e.g., mathematical formulas) can be defined for cells within the spreadsheet 506 to implement the functionality (or functionalities). In the discussion of FIG. 5, reference is made to the spreadsheet application 504 and the source spreadsheet 506. However, in other implementations, other types of applications (such as other types of off-the-shelf applications) and other types of templates can be utilized.

The source spreadsheet 506 contains cells. Certain of the cells are defined by the service designer to be associated with logic for implementing the one or more functionalities associated with a new service that is being created by the service designer.

Because the spreadsheet application 504 (or other off-the-shelf application that can be provided at the service designer station 502) is generally familiar to many users, the service designer who can implement the new functionality (or functionalities) does not have to be a skilled programmer—in fact, the service designer can be a business manager or other user who is not a skilled programmer. The ability to easily implement new functionalities by a wider variety of personnel enables for more cost-effective and efficient implementation of functionalities, such as those associated with network-based applications.

The service designer also creates a mapping table 508 (which can be the mapping table 214 of FIG. 2). Also, the service designer defines a class structure 510 for the new service. A class structure includes one or more variables, each including a field name and a type. An example class structure (referred to as "Supplier" in the example) is depicted below:

```
class Supplier
{
String name;
int price;
int lot;
int contact;
int cost;
enum CountryList location;
};
```

In the example class structure, named "Supplier," six variables are defined. A first variable contains a field name "name" that is of type string; the second variable has a field name "price" of type integer; a third variable has a field name "lot" of type integer; a fourth variable has field name "contact" of type integer; a fifth variable has field name "cost" of type integer; and a sixth variable has a field name "location" of type "enum CountryList." The variables are provided for purposes of example, as other variables and other types of classes can be defined in other implementations. The example variables depicted above are part of the variables 212 depicted in FIG. 2.

Based on the class structure 510, an example mapping table (corresponding to the mapping table 214 depicted in FIG. 2) can be defined as follows:

| Mode | Cell Name | Class | PK | Field |
|------|-----------|----------|----|-------|
| In | A2 | Supplier | 1 | Name |
| In | A3 | Supplier | 2 | Name |
| In | A4 | Supplier | 3 | Name |
| In | B2 | Supplier | 1 | Price |
| In | B3 | Supplier | 2 | Price |
| In | B4 | Supplier | 3 | Price |
| In | C2 | Supplier | 1 | Lot |
| In | C3 | Supplier | 2 | Lot |
| In | C4 | Supplier | 3 | Lot |
| Out | D2 | Supplier | 1 | Cost |
| Out | D3 | Supplier | 2 | Cost |
| Out | D4 | Supplier | 3 | Cost |

The mapping table depicted above has a "Mode" column that identifies whether a particular variable (such as "Name," "Price," "Lot," or "Cost") is an input variable or an output variable. A "Cell name" column identifies a cell position within the spreadsheet file for storing a data value for the corresponding variable (identified in a "Field" column). Effectively, the mapping table maps variables in the "Field" column to locations (cells) in the closure document. A "Class" column identifies the class structure that the mapping table is associated with. A "PK" column in the mapping table above identifies a primary key value that each entry of the mapping table is associated with. For example, the primary key can be a unique identifier.

As noted above, a "Cell name" refers to a cell position when data values are stored in a spreadsheet. For example, in the following table that represents a portion of a spreadsheet file, the cell position A2 stores the value "ABC" and the cell position D4 stores the value "60,000."

|   | A | B | C | D |
|---|-----|-----|------|---------|
| 2 | ABC | 100 | 1000 | 100,000 |
| 3 | DEF | 90  | 2000 | 180,000 |
| 4 | GHI | 120 | 500  | 60,000  |

The source spreadsheet 506 is provided as an input to the running system 500, where the source spreadsheet forms the template in the running system 500 for use in creating a closure document as discussed above. Similarly, the mapping table 508 is provided as an input to the running system 500.

The class structure 510 is provided to a converters layer 512 that includes several converters, such as an HTML generator 514, a class definition generator 516, and a database generator 518. The converters layer 512 can actually be part of the service designer station 502, or alternatively, the converters layer 512 can be implemented in a separate node. Generally, the converters layer 512 includes converters to generate data structures for use in the running system 500 for generating the closure document.

The class structure 510 is applied through the HTML generator 514 to generate an HTML document 520 that is loaded in the running system 500. The HTML document 520 contains fields that can be displayed by a user interface in the running system 500 (or at a client). The HTML document 520 is able to present the fields in the following example format: an arrangement of field names 522 (corresponding to the variables defined by the class structure 510) and associated text boxes 524 in which a user can enter data for the corresponding field name. The user-entered data are used to update content of a data table 528 that is part of a database 530.

The class definition generator 516 generates a class object 526 based on the class structure 510. The class object 526 is used in the running system 500 to provide a class definition for each of the variables contained in the class structure 510. For the example class structure provided above, the following class object can be defined:

Class Supplier
Name:string:
Price:numeric:
Lot:numeric:
Contact:numeric:User
Cost:numeric
Location:enum_Country:

The database generator 518 in the converters layer 512 generates the data table 528 for storage in the database 530 in the running system 500 from the class structure 510 defined by the service designer in the service designer station 502. The data table 528 (which can be a relational table) is arranged as rows and columns. The various variables defined by the class object 526 are assigned to respective columns in the data table 528, and data values for these variables populate the various entries of the data table 528. Based on the mapping table 508 and class object 526, the content of the data table 528 can be used to populate a closure document developed based on the template (source spreadsheet 506) in the running system 500.

An example data table according to the class structure 510 defined by the service designer is depicted below.

| Primary Key | Name | Price | Lot | Contact | Location |
|---|---|---|---|---|---|
| 1 | ABC | 100 | 1000 | 103 | United States |
| 2 | DEF | 90 | 2000 | 24 | Canada |
| 3 | GHI | 120 | 500 | 501 | United States |

Content of the data table 528 is accessed using database language query statements, such as SQL statements. The SQL statements used to access the data table 528 can also be provided by the database generator 518 for use in the running system 500.

Instructions or code of software described above (including the software modules in FIGS. 1, 2, and 5) are loaded for execution on a processor. The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of providing at least one functionality, comprising:
    providing a template containing one or more logic components and associated data closure information corresponding to the at least one functionality;
    accessing, by a processor, the template to retrieve the one or more logic components to embed into a closure document; and
    accessing, by the processor, a data collection to load data according to the data closure information into the closure document to enable processing of the data in the closure document with the embedded one or more logic components.

2. The method of claim 1, further comprising identifying an off-the-shelf application capable of supporting the at least one functionality, wherein the one or more logic components correspond to logic used by the off-the-shelf application.

3. The method of claim 2, further comprising using the off-the-shelf application to generate the template containing the one or more logic components and the data closure information.

4. The method of claim 1, further comprising identifying a spreadsheet application capable of supporting the at least one functionality, wherein the one or more logic components correspond to logic used by the spreadsheet application.

5. The method of claim 1, further comprising using a spreadsheet application to generate a source spreadsheet containing the one or more logic components, the source spreadsheet used as the template.

6. The method of claim 1, further comprising:
    creating mapping information to map variables used by the at least one functionality with locations in the closure document; and
    using the mapping information to load the data into the closure document.

7. The method of claim 1, wherein the at least one functionality comprises at least one functionality associated with a web-based application, the method further comprising using the closure document to effect the at least one functionality of the web-based application.

8. The method of claim 1, wherein the providing and accessing steps are performed in a server, the method further comprising:
    sending the closure document from the server to a client to enable modification of the data in the closure document by the client while the client is offline; and
    the server receiving, from the client, the closure document containing the modified data once the client is online with respect to the server.

9. The method of claim 1, further comprising:
    providing a class structure containing variables for the at least one functionality; and
    generating the data collection based on the class structure.

10. The method of claim 9, further comprising generating a second document presentable to a user to allow user assignment of data values to the variables.

11. A method comprising:
loading, by a server computer, data from a data collection into a document;
loading, by the server computer, logic into the document;
communicating the document from the server computer to a client to enable updating, at the client, of data in the document using the logic in the document;
receiving, by the server computer, the document containing the updated data from the client; and
integrating the updated data into the data collection.

12. The method of claim 11, wherein the logic contained in the document corresponds to one or more business services, and wherein communicating the document from the server computer to the client enables implementation of the one or more business services.

13. The method of claim 11, wherein communicating the document to the client to enable updating at the client comprises communicating the document to the client to enable offline updating of data in the document at the client.

14. The method of claim 11, further comprising:
providing a template that contains the logic; and
creating the document by accessing the template, wherein accessing the template enables loading of the logic in the template into the document.

15. The method of claim 11, further comprising:
updating the data in the document at the server computer; and
integrating the updated data into the data collection.

16. The method of claim 11, wherein communicating the document to the client to enable updating at the client comprises communicating the document to the client to enable updating by an off-the-shelf application in the client.

17. The method of claim 11, wherein the data collection comprises at least a table, the method further comprising:
defining a class structure that includes variables contained in the data collection; and
generating the table from the defined class structure.

18. An article comprising at least one storage medium containing instructions for implementing at least one functionality, the instructions when executed causing a computer to:
store a template having one or more logic components corresponding to the at least one functionality;
store a data collection containing data associated with variables of the at least one functionality;
access the template and data collection to load the one or more logic components and the data into a closure document; and
provide the closure document to enable updating of data in the closure document using the one or more logic components.

19. The article of claim 18, wherein the instructions when executed cause the computer to further send the closure document to a remote node to enable updating of data using the one or more logic components in the closure document at the remote node while the remote node remains offline.

20. The article of claim 18, wherein the one or more logic components are provided by an off-the-shelf application.

* * * * *